United States Patent
Wong et al.

(10) Patent No.: US 10,644,604 B2
(45) Date of Patent: May 5, 2020

(54) FLYBACK SWITCHING POWER SUPPLY

(71) Applicant: Joulwatt Technology (Hangzhou) Co., Ltd., Hangzhou (CN)

(72) Inventors: Pitleong Wong, Hangzhou (CN); Xunwei Zhou, Hangzhou (CN)

(73) Assignee: JOULWATT TECHNOLOGY (HANGZHOU) CO., LTD., Hangzhou (CN)

( * ) Notice: Subject to any disclaimer, the term of this patent is extended or adjusted under 35 U.S.C. 154(b) by 0 days.

(21) Appl. No.: 16/407,175

(22) Filed: May 8, 2019

(65) Prior Publication Data
US 2019/0348920 A1    Nov. 14, 2019

(30) Foreign Application Priority Data
May 8, 2018 (CN) .......................... 2018 1 0433767

(51) Int. Cl.
*H02M 3/335* (2006.01)
*H02M 1/00* (2006.01)

(52) U.S. Cl.
CPC ... *H02M 3/33523* (2013.01); *H02M 3/33592* (2013.01); *H02M 2001/0032* (2013.01)

(58) Field of Classification Search
CPC . H02M 2001/0032; H02M 2001/0035; H02M 3/33523; H02M 3/33592
See application file for complete search history.

(56) References Cited

U.S. PATENT DOCUMENTS

| | | | | |
|---|---|---|---|---|
| 2014/0043863 A1* | 2/2014 | Telefus | ............. | H02M 3/33592 363/17 |
| 2017/0149340 A1* | 5/2017 | Ye | ........................ | H02M 1/4258 |
| 2017/0353099 A1* | 12/2017 | Yang | ........................ | H02M 1/08 |
| 2018/0115252 A1* | 4/2018 | Chang | ............... | H02M 3/33592 |
| 2018/0294734 A1* | 10/2018 | Song | ................ | H02M 3/33592 |

* cited by examiner

*Primary Examiner* — Fred E Finch, III
(74) *Attorney, Agent, or Firm* — Treasure IP Group, LLC

(57) ABSTRACT

A flyback switching power supply, comprising a main power switch, a transformer and a rectifier is described. The transformer comprises a primary winding and a secondary winding, the main power switch is connected with the primary winding, the rectifier is connected with the secondary winding. When the output voltage of the flyback switching power supply is lower than a first threshold value, the rectifier is controlled to be turned on for a transient period; by detecting the negative current flowing through the main power switch, performing integral operation on the voltage across the auxiliary winding, and sampling the peak voltage of the drain-to-source voltage of the main power switch for several times, whether the rectifier is turned on can be determined if the output voltage at the secondary side is lower than the threshold voltage, and the main power switch is controlled to be turned on accordingly.

14 Claims, 3 Drawing Sheets

FLYBACK SWITCHING POWER SUPPLY

CROSS-REFERENCE TO RELATED APPLICATION

This application claims priority to the Chinese Patent Application No. 201810433767.1, filed on May 8, 2018 entitled "Flyback switching power supply", which is incorporated herein by reference in its entirety.

BACKGROUND OF THE DISCLOSURE

Field of the Disclosure

The present invention relates to a technical field of power electronics, and particularly to a flyback switching power supply.

Description of the Related Art

In order to stabilize an output voltage, conventional flyback convertors, i.e., flyback switching power supplies, are required to sample the output voltage at output side to achieve feedback control and transmit error signal to a primary-side controller through an optical coupler, wherein the primary-side controller is configured to adjust switching operation on a switch according to the above-mentioned error signal, so that the output voltage can be adjusted. To further reduce costs, in some low-power flyback transformer, based on a feature that a voltage sensed by an auxiliary winding of the transformer is proportioned to the output voltage during a turn-off phase of the primary-side switch, the primary-side controller is configured to sample the output voltage directly by the auxiliary winding, to achieve control on the output voltage, which is a primary-side control technique of the flyback switching power supply. According to the primary-side control technique, in order to obtain information of the output voltage, the primary-side switch must be turned off and turned on at least once, only then can the output voltage be sampled by the auxiliary winding. Under conditions with light load or no load, in order to improve efficiency under light-load condition and reduce standby loss, switching frequency of the primary-side switch operated under a light-load or no-load condition will drop to a very low value, that is, sampling frequency for the output voltage is very low.

When the sampling frequency is very low, if loading condition changes from a light-load or no-load condition to a heavy-load condition, it requires a long time for the primary-side controller to detect changes on the output voltage, and it also requires a long time to improve the switching frequency of a main power switch at the primary side to a level matching the heavy-load condition, so that the output voltage will drop obviously and dynamic response performance is poor.

SUMMARY OF THE INVENTION

The object of the present invention is to provide a flyback switching power supply and a control circuit for the same, for solving a technical problem, existing in the conventional technology, that the output voltage drops after a sudden change occurs on the loading condition.

To achieve the above object, according to a first embodiment of the present disclosure, there is provided a flyback switching power supply, comprising a main power switch, a transformer and a rectifier, wherein the transformer comprises a primary winding and a secondary winding, the main power switch is connected with the primary winding, the rectifier is connected with the secondary winding, a control terminal of the main power switch is connected with a primary-side controller, a control terminal of the rectifier is connected with a secondary-side controller;

wherein when an output voltage of the flyback switching power supply is lower than a first threshold value, the rectifier is controlled to be turned on for a transient period by the secondary-side controller;

wherein the primary-side controller is configured to detect a negative current flowing through the main power switch for determining whether the rectifier is turned on or not, to determine that the output voltage at secondary side is lower than a threshold voltage when the negative current reaches a second threshold value, and to control the main power switch to be turned on.

In an exemplary embodiment, the primary-side controller further comprises a first current limitation module configured to detect the current flowing through the main power switch, and to limit the current flowing through the main power switch when the current reaches a current limiting value, thus preventing the primary side from being connected to secondary side directly or through a common connection.

In an exemplary embodiment, the secondary-side controller comprises a second current limitation module configured to detect a current flowing through the rectifier, and to limit the current flowing through the rectifier when the current flowing through the rectifier reaches a current limiting value.

In an exemplary embodiment, when a current flowing through the secondary winding drops to zero, after a first latency period, the negative current flowing through the main power switch starts to be detected.

In an exemplary embodiment, after the current flowing through the secondary winding drops to zero, when the output voltage be lower than the first threshold voltage is detected and a second latency period reaches after the rectifier is turned off, the rectifier is controlled to be turned on for the transient period if the main power switch is not turned on.

In an exemplary embodiment, the flyback switching power supply further comprises an auxiliary winding coupled with the transformer, wherein the auxiliary winding is connected with a voltage detecting module configured to detect a voltage across the auxiliary winding, the main power switch is controlled to be turned on when the negative current flowing through the main power switch reaches the second threshold value.

According to a second embodiment of the present disclosure, there is provided a flyback switching power supply, comprising a main power switch, a transformer and a rectifier, wherein the transformer comprises a primary winding and a secondary winding, the main power switch is connected with the primary winding, the rectifier is connected with the secondary winding, a control terminal of the main power switch is connected with the primary-side controller, a control terminal of the rectifier is connected with a secondary-side controller;

wherein when an output voltage of the flyback switching power supply is lower than a first threshold value, the rectifier is controlled to be turned on for a transient period by the secondary-side controller;

the flyback switching power supply further comprises an auxiliary winding coupled with the transformer, the auxiliary winding is connected with a voltage detecting module configured to detect a voltage across the auxiliary winding, sample an input voltage of the auxiliary winding for obtaining a first voltage signal, and to perform a volt-second integral operation to obtain a result, when the result of the volt-second integral operation reaches a third threshold value, it is determined that the output voltage of the flyback switching power supply is lower than the first threshold value and the main power switch is controlled to be turned on when the voltage across the auxiliary winding is less than a low threshold value.

In an exemplary embodiment, performing the volt-second integral operation is to convert the first voltage signal to a corresponding current signal, and to charge a capacitor by the current signal when the first voltage signal is higher than a threshold value equal to or close to 0, wherein a voltage between two terminals of the capacitor represents the result of the volt-second integral operation.

In an exemplary embodiment, when the current flowing through the secondary winding drops to zero, after a first latency period, the result of the volt-second integral operation is compared with a third threshold value.

In an exemplary embodiment, a plurality of the results are obtained by performing the volt-second integral operation for several times, if the result obtained by the volt-second integral operation performed last time is lower than a fourth threshold value and the result obtained by the volt-second integral operation performed at present reaches the third threshold value, then it is determined that the output voltage of the flyback switching power supply is lower than the first threshold value, wherein the fourth threshold value is less than the third threshold value.

In an exemplary embodiment, the flyback switching power supply comprises an integrating control circuit, the integrating control circuit comprises a voltage-to-current converter and an integrating capacitor, the voltage-to-current convertor is configured to receive the first voltage signal and convert the first voltage signal to a corresponding current signal, the integrating capacitor is charged directly by the corresponding current signal or by a mirror generated from the corresponding current signal by a mirror module, each of the volt-second integral operation starts when the first voltage signal is greater than zero or a threshold value close to zero, and the integrating capacitor is completely discharged or reset when the first voltage signal is less than zero or a threshold value close to zero.

According to a third embodiment of the present disclosure, there is provided a flyback switching power supply, comprising a main power switch, a transformer and a rectifier, wherein the transformer comprises a primary winding and a secondary winding, the main power switch is connected with the primary winding, the rectifier is connected with the secondary winding, a control terminal of the main power switch is connected with a primary-side controller, a control terminal of the rectifier is connected with a secondary-side controller;

the flyback switching power supply further comprises an auxiliary winding coupled with the transformer, the auxiliary winding is connected with the primary-side controller; when the output voltage of the flyback switching power supply is lower than a first threshold value, the rectifier is controlled to be turned on for a transient period by the secondary-side controller; a voltage at a common node connected between the main power switch and the primary winding, a drain-to-source voltage of the main power switch or an input voltage of the auxiliary winding is sampled to obtain a peak voltage, it is determined that the output voltage is lower than the first threshold value when a difference between the peak voltage sampled last time and the peak voltage sampled at current time reaches a difference threshold value, and the main power switch is controlled to be turned on by the primary-side controller when a voltage across the auxiliary winding is lower than a low threshold value.

In an exemplary embodiment, when a current flowing through the secondary winding drops to zero, after a first latency period, the difference between the peak voltage sampled last time and the peak voltage sampled at current time is compared with the difference threshold value.

In an exemplary embodiment, during a process for obtaining the peak voltage by sampling the voltage at the common node connected between the main power switch and the primary winding, the drain-to-source voltage of the main power switch or the voltage across the auxiliary winding, if the peak voltage is not able to be detected after oscillation is attenuated, a latest ripple peak value during oscillation is regarded as the peak voltage sampled last time, an increased voltage caused by the transiently turn-on rectifier is detected as the peak voltage sampled at current time by peak sampling operation.

According to a fourth embodiment of the present disclosure, there is provided a flyback switching power supply, comprising a main power switch, a transformer and a rectifier, wherein the transformer comprises a primary winding and a secondary winding, the main power switch is connected with the primary winding, the rectifier is connected with the secondary winding, a control terminal of the main power switch is connected with a primary-side controller, a control terminal of the rectifier is connected with a secondary-side controller;

the flyback switching power supply further comprises an auxiliary winding coupled with the transformer, the auxiliary winding is connected with the primary-side controller; when the output voltage of the flyback switching power supply is lower than a first threshold value, the rectifier is controlled to be turned on by the secondary-side controller for a transient period; a voltage at a common node connected between the main power switch and the primary winding, a drain-to-source voltage of the main power switch or an input voltage of the auxiliary winding is sampled to obtain a peak voltage, when the peak voltage sampled last time is lower than a fifth threshold value and the peak voltage sampled at current time reaches a sixth threshold value, the output voltage of the flyback switching power supply is determined to be lower than the first threshold value, the main power switch is controlled to be turned on by the primary-side controller when a voltage across the auxiliary winding is lower than a low threshold value, wherein the fifth threshold value is lower than the sixth threshold value.

In an exemplary embodiment, when a current flowing through the secondary winding drops to zero, after a first latency period, the peak voltage sampled last time is compared with the fifth threshold value and the peak voltage sampled at current time is compared with the sixth threshold value, respectively.

In an exemplary embodiment, during a process for obtaining the peak voltage by sampling the voltage at the common node connected between the main power switch and the primary winding, the drain-to-source voltage of the main power switch or the voltage across the auxiliary winding, if the peak voltage is not able to be detected after oscillation is attenuated, a latest ripple peak value during oscillation is detected as the peak voltage sampled last time, a voltage rising value caused by the transiently turn-on rectifier is detected as the peak voltage sampled at current time by peak sampling operation.

Compared with the prior art, the technical solution of the present invention has the following advantages: in the present invention, by detecting the output voltage of the flyback switching power supply, when the output voltage drops to a corresponding threshold value, the rectifier at secondary side is controlled to be turned on for a transient period, and because the turn-on rectifier will generate a negative current at the primary side and change the voltage across the auxiliary winding, whether the output voltage drops or not can be determined by detecting the negative current at the primary side or by detecting a voltage change across the auxiliary winding, if it is determined that the output voltage drops, the main power switch at the primary side is controlled to be turned on, by detecting the negative current flowing through the main power switch, performing integral operation on the voltage across the auxiliary winding, and sampling the peak voltage of the drain-to-source voltage of the main power switch for several times, whether the rectifier is turned on or not can be determined for judging whether the output voltage at the secondary side is lower than the threshold voltage, so that dynamic response is improved when a sudden change on loading condition occurs, and the present disclosure can efficiently avoid direct connections between the primary side and the secondary side at the same time.

BRIEF DESCRIPTION OF THE DRAWINGS

By following description of embodiments with reference to the accompanying drawings of the present invention, the above and other objects, features and advantages of the present invention will become apparent.

DETAILED DESCRIPTION OF THE DISCLOSURE

Reference will now be made in detail to particular embodiments of the present disclosure, examples of which are illustrated in the accompanying drawings. However, it should be understood that the present disclosure is not limited to these examples. The present disclosure is intended to cover alternatives, modifications and equivalents that may be included within the spirit and scope of the disclosure as defined by the appended claims.

Furthermore, in the following detailed description of the present disclosure, numerous specific details are set forth in order to provide a thorough understanding of the present disclosure. However, it will be readily apparent to one skilled in the art that the present disclosure may be practiced without these specific details.

Reference will now be made in detail to particular embodiments of the disclosure, examples of which are illustrated in the accompanying drawings. It should be noted that the drawings are made of a more simplified form and are using a non-precise proportion, only to facilitate, assist clarity purpose of illustrating an embodiment of the present invention.

Figure 1:
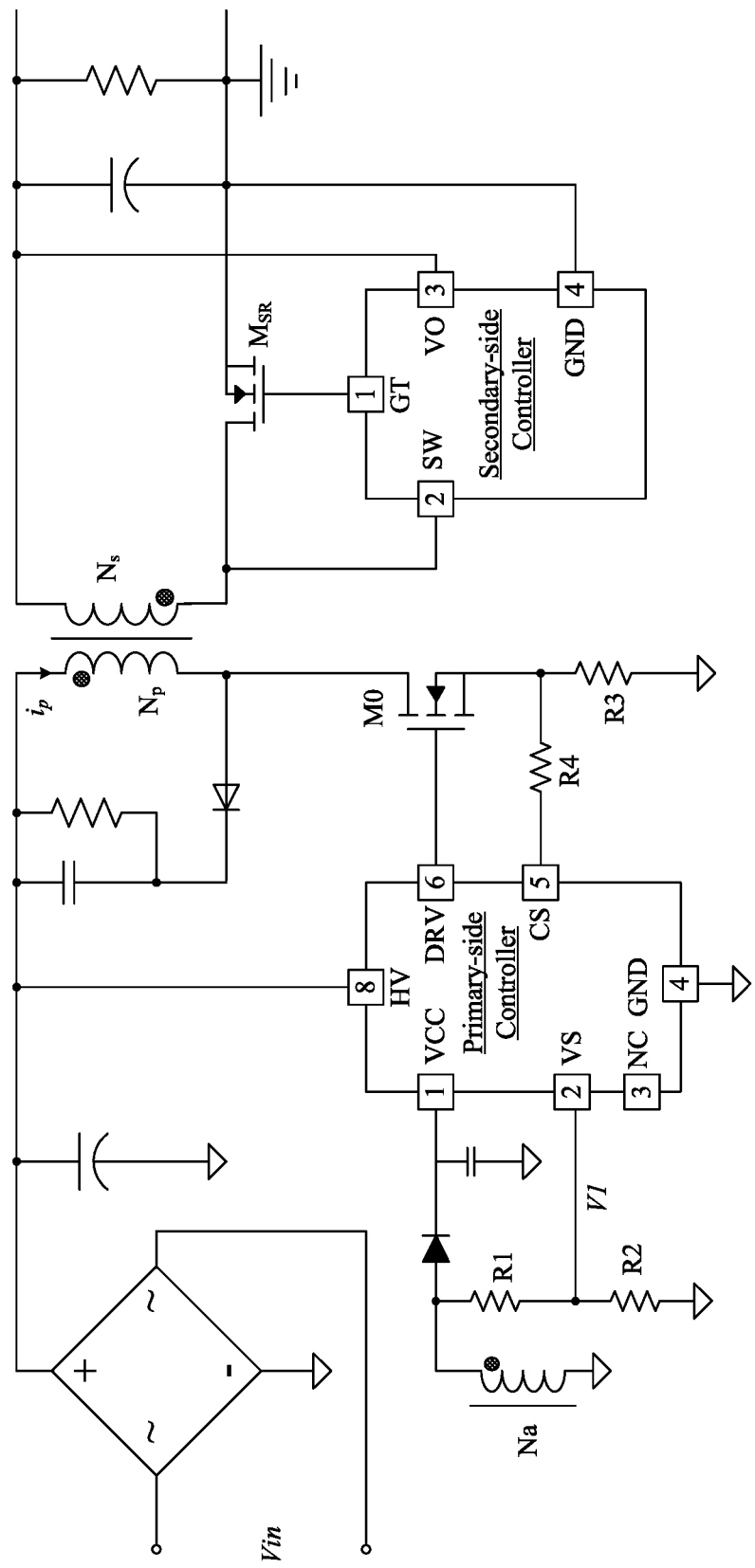
FIG. 1 shows a circuit schematic diagram of a flyback switching power supply according to a first embodiment of the present disclosure.

As shown in FIG. 1, a circuit schematic diagram of a flyback switching power supply is shown according to a first embodiment of the present disclosure. According to the present disclosure, the flyback switching power supply comprises a main power switch M0, a transformer and a rectifier, the transformer comprises a primary winding Np and a secondary winding Ns, the main power switch M0 is connected with the primary winding Np, and the rectifier is connected with the secondary winding Ns. The rectifier is realized by a transistor, as shown in FIG. 1, a metal-oxide-semiconductor field effect transistor (MOSFET) serves as the rectifier MSR, which is also called a synchronous rectifier and can be realized by an N-type or a P-type MOSFET with enhancement mode or a MOSFET of other type, the above-mentioned alternative designs are commonly known by those skilled in the art. The synchronous rectifier can achieve rectification at high-voltage side or low-voltage side.

In this embodiment, the exemplary synchronous rectifier is realized by an N-type MOSFET with enhancement mode, the synchronous rectifier is turned on when a current flows from its source to drain, and is turned off when the current flows from its drain to source. A control unit for normally turning on and turning off the synchronous rectifier can be comprised in the secondary-side controller, or be implemented as a separate control circuit.

The flyback switching power supply further comprises a control circuit, the control circuit comprises a primary-side controller and a secondary-side controller, the primary-side controller is connected with a control terminal of the main power switch M0 located at primary side, and the secondary-side controller is connected to a control terminal of the rectifier MSR located at secondary side. The primary-side controller and the secondary-side controller can be realized by integrated circuits, respectively. Depending on components and practical applications, the primary-side controller and the secondary-side controller can be entirely or partially integrated in chips. The primary-side controller is connected with an auxiliary winding Na, the primary-side controller can be powered through the auxiliary winding Na.

When the output voltage of the flyback switching power supply is lower than a first threshold value, the rectifier is controlled to be turned on for a transient period; in general applications of the present disclosure, discontinuous conduction mode (DCM) is operated, the main power switch and the rectifier are both in turn-off state before the rectifier is controlled to be turned on for a transient period.

The rectifier turned on for the transient period can generate a negative current at the primary side, so that whether the rectifier is turned on or not can be determined by detecting the negative current flowing the main power switch, when the negative current reaches a second threshold value, the negative current can be indicated by a corresponding voltage, in the present disclosure, a voltage at pin CS is used to determine if the output voltage at the secondary side is lower than a threshold voltage, then the main power switch is controlled to be turned on accordingly.

The primary-side controller further comprises a first current limitation module configured to detect the current flowing through the main power switch, and to limit the current flowing through the main power switch when the current flowing through the main power switch reaches a current limiting value, in order to prevent the current flowing through the main power switch from being too large when the primary side is connected to the secondary side directly or through a common connection.

Those of ordinary skill in the art can be aware of detail implementations of the current limitation module in light of the present disclosure, so that the detail implementations of the current limitation modules are not shown in the drawings for the sake of clarity. The secondary-side controller further comprises a second current limitation module configured to limit the current flowing through the rectifier, to avoid damages caused by excessively large current generated when there is a direct connection between the primary side and the secondary side.

Transient conduction of the rectifier can be equivalently controlled by a pulse, wherein the pulse width of the pulse represents the transient period during which the rectifier is turned on. Continuous detection on the output voltage can be achieved by the secondary-side controller configured to control state of the rectifier in accordance with detected results of the continuous detection.

The primary-side controller is connected with an auxiliary winding Na, and is powered through the auxiliary winding Na, which is connected with a power supply pin VCC of the primary-side controller, coupled to the transformer, and connected with a voltage detecting module configured to detect a voltage between two ends of the auxiliary winding Na. The voltage detecting module comprises resistors R1 and R2 connected in series to form a voltage divider, a common end connected between the resisters R1 and R2 is connected with pin VS Of the primary-side controller. Because the auxiliary winding Na is coupled to an output winding, there is a fixed ratio between the winding numbers of the auxiliary winding and the output winding. When the main power switch M0 is turned on, the transformer is configured to store energy; when the main power switch M0 is turned on, the rectifier MSR at the secondary side is turned on, at this time, a sensed voltage between two terminals of the winding Na is proportional to the output voltage. The primary-side controller is configured to obtain information of the output voltage by sampling information of a voltage at pin VS. It should be noted that the primary-side controller can only sample the output voltage when the rectifier at the secondary side is turned on.

Resister R3 is configured to sample a current flowing through the main power switch M0, one end of R3 is connected to a primary-side ground with zero voltage potential, when a voltage across R3 is positive, it is indicated that the current flowing through the main power switch is positive. When the voltage across R3 is negative, it is indicated that the current through the main power switch is negative. If the voltage detecting module detects that the input voltage of the auxiliary winding is lower than a predetermined threshold value (i.e., a low threshold value) which is quite low, it is indicated that the rectifier is in turn-off state, if the primary-side controller detects that the negative current reaches a second threshold value at this time, the main power switch M0 is controlled to be turned on by the primary-side controller, wherein the low threshold value is zero or close to zero. Here, the voltage detecting module is configured to prevent the primary side from being connected to the secondary side through a common connection, that is, it is required that the rectifier at the secondary side has already been turned off when the main power switch is turned on.

Normally, the negative current is detected if a negative voltage for representation is detected. As shown in FIG. 1, the main power switch M0 has a first end connected with the primary winding Np and a second end connected to ground through resister R3, one end of resister R4 is connected to a common node connected between the second end of the main power switch M0 and resister R3, and the other end of resister R4 is connected to a detection pin CS of the primary-side controller, wherein a voltage at pin CS is related to a voltage across the resister R3 which is used for sampling. Polarity and amplitude of the voltage at pin CS represent polarity and amplitude of a sampled current, respectively. The voltage at pin CS representing the negative current is compared with a voltage Vref2 representing the second threshold value, so that it can be determined whether the negative current has reached the second threshold value or not. In addition, the primary-side controller further comprises a driving pin DRV, which is connected to a gate electrode of the main power switch M0.

A common node connecting the secondary winding Ns and the rectifier MSR is connected to pin SW. Further, the secondary-side controller has an output voltage pin Vo, a voltage between pin Vo and ground pin GND represents the output voltage.

Figure 2:
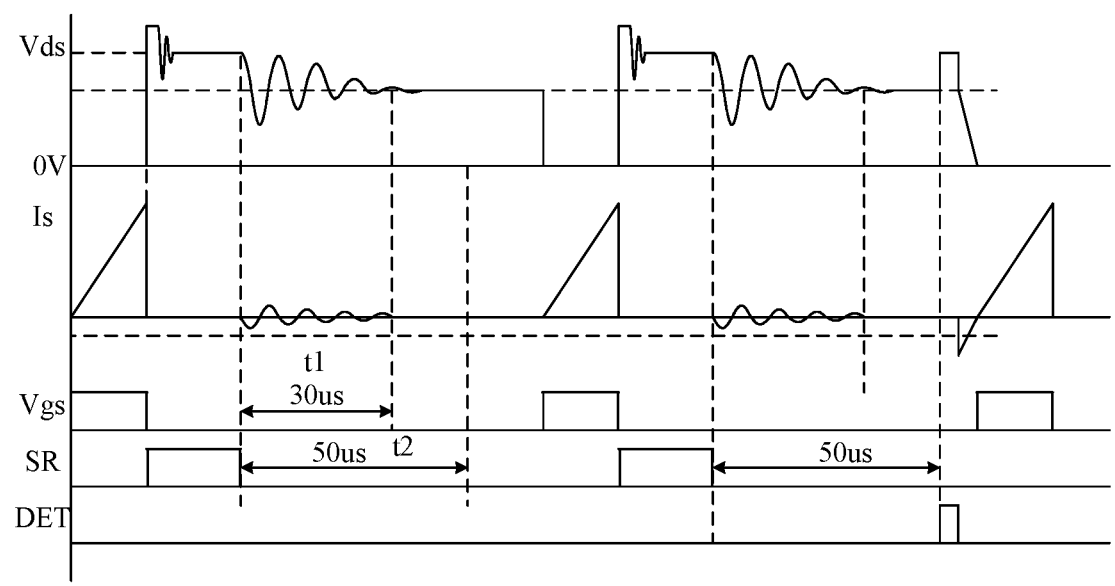
FIG. 2 shows operating waveform diagrams of a flyback switching power supply according to an embodiment of the present disclosure.

As shown in FIG. 2, operating waveforms of a flyback switching power supply are shown according to the first embodiment of the present disclosure, operating waveforms according to other embodiments of the present disclosure may also refer to FIG. 2. The rectifier realized by a MOSFET is taken as an example here, basing on the exemplary schematic circuit according to the first embodiment. Here Vds represents a drain-to-source voltage of the main power switch M0, Is represents the current flowing through the main power switch M0, and Vgs represents a gate-to-source voltage of the main power switch. SR is a control signal for the rectifier MSR. Wherein, signal DET is used to control the rectifier to be turned on for the transient period, when the output voltage is detected to be lower than a corresponding threshold value, the signal DET generates a pulse to turn on the rectifier for the transient period.

Referring to FIG. 1, technical solution and operating process of the present disclosure are further described. Because an excitation inductance and parasitic capacitors may generate an oscillating current due to parasitic oscillation which generally remains for 10 cycles after the secondary-side current crosses zero, in order to avoid wrongly taking the oscillating current as the negative current, a first latency period t1 for delay is set after the primary-side current crosses zero or after the rectifier is turned off, as shown in FIG. 2, the first latency period t1 for may be set to 30 us, after which the negative current flowing through the main power switch M0 starts to be detected at pin CS, wherein a threshold value for detecting the negative current, i.e., the second threshold, may range from −10 mV to 20 mV approximately. If the voltage detecting module detects that the input voltage of the auxiliary winding is zero, that is, VS=0, then it is indicated that the rectifier MSR is in turn-off state, at this time, the primary-side controller is configured to control the rectifier MSR to be turned on when the primary-side controller detects that the negative current reaches the second threshold value, in order to respond to a voltage drop at the secondary side; if the negative current is not detected, the primary-side controller is configured to turn on the rectifier following a predetermined control process. In addition, during the first latency period t1, if the main power switch at the primary side is turned on again, then it is indicated that the switching frequency is still relatively high, which shows that the dynamic response problem doesn't exist.

In the secondary-side controller, after the rectifier MSR is turned off based on a normal logic, a function for detecting the output voltage is enabled, when the output voltage is lower than a predetermined value, i.e., the first threshold value (e.g. 4.75V), after the rectifier MSR is turned off and then a second latency period t2 is reached, the rectifier MSR at the secondary side is controlled to be turned on for a transient period, in order to transfer information of the negative current to the primary side for informing the primary side to turn on the main power switch M0. Alternatively, the function for detecting the output voltage can be enabled all the time.

The second latency time t2 may be set to 50 us approximately, based on the following consideration: the primary side is required to enable the function for detecting the negative current after 30 us, so that a longer time is set for the secondary side appropriately considering a certain tolerance or margin. Furthermore, the second latency period set to 50 us represents that the switching frequency is not lower than 20 kHz, so that during 50 us, the dynamic response problem doesn't exist under normal circumstances. In general, the rectifier begins to be operated in turn-off state when the secondary-side current crosses zero, so that a moment that the secondary-side current crosses zero can be approximatively regard as a moment that the rectifier begins to be operate in turn-off state, but in practice the two moments are not strictly same time.

The transient period for turning on the rectifier MSR may be set to 1 us approximately or within 1 us, and should be specifically set according to practical parameters. Besides that the transient period for turning on the rectifier may be limited to a specific time period, the transient period may also be determined according to the secondary-side current.

In the present disclosure, a fast response to voltage drop of the output voltage is achieved by turning on the main power switch M0, so that original control logic of the main power switch is required to be changed. Thus, a problem that the primary side may be connected directly to the secondary side should be concerned. At the moment that the rectifier MSR located at the secondary side is controlled to be turned on, because no information interaction is performed between the primary side and the secondary side, there is a probability that the primary side and the secondary side is commonly connected to each other, thus a technical solution for preventing the primary side from being commonly connected to the secondary side is required.

A solution for avoiding common connection between the primary side and the secondary side is that, the secondary-side controller is configured to store a last switching cycle of the main power switch at the primary side and set an expected turn-on time of the present switching cycle for the main power switch at the primary side the same with the practical turn-on time of the last switching cycle for the main power switch at the primary side; after the rectifier MSR is turned off, when the output voltage is detected to be lower than the first threshold value and the second latency period t2 reaches after the rectifier MSR is turned off, if the expected turn-on time of the present switching cycle for the main power switch at the primary side doesn't reach, the rectifier MSR is controlled to be turned on.

According to a second embodiment of the present disclosure, the circuit schematic of the flyback switching power supply also refers to FIG. 1 and comprises a main power switch M0, a transformer and a rectifier MSR, the transformer comprises a primary winding Np and a secondary winding Ns, the main power switch M0 is connected with the primary winding Np, and the rectifier MSR is connected with the secondary winding Ns; when the output voltage of the flyback switching power supply is lower than a first threshold voltage, the rectifier is controlled to be turned on for a transient period. Moreover, in this embodiment, portions same with that in the first embodiment can refer to corresponding descriptions of the first embodiment.

The flyback switching power supply further comprises an auxiliary winding, which is coupled to the transformer and connected to a voltage detecting module configured to detect a voltage across the auxiliary winding, the voltage detecting module comprises resistors R1 and R2 connected in series to form a voltage divider, a common node connected between the resisters R1 and R2 is connected with pin VS of the primary-side controller. The voltage detecting module is configured to sample the input voltage of the auxiliary winding Na to obtain a first voltage signal V1, to perform a volt-second integral operation on the first voltage signal V1 to obtain a result of the volt-second integral operation, to determine whether the output voltage of the flyback switching power supply is lower than the first threshold value when the result of the volt-second integral operation reaches a third threshold value Vref3, and to control the main power switch to be turned on when the voltage across the auxiliary winding is lower than the low threshold value, wherein the volt-second integral operation is for integrating voltage by time. Difference between the first embodiment and the second embodiment is that, the first embodiment is implemented by a first solution detecting the negative current at the primary side, while the second embodiment is implemented by a second solution applying the volt-second integral operation on the voltage across the auxiliary winding, both of the first solution and the second solution have a same purpose.

Performing the volt-second integral operation on the first voltage signal is to convert the first voltage signal V1 to a corresponding current signal, and to charge a capacitor by the current signal when the first voltage signal is higher than a threshold value equal to or close to 0, wherein a voltage between two ends of the capacitor represents the result of the volt-second integral operation. When the current flowing through the secondary winding drops to zero, after a first latency period, the result of the volt-second integral operation is compared with the third threshold value. A plurality of the results are obtained by performing the volt-second integral operation for several times, if the result obtained by the volt-second integral operation performed last time is lower than a fourth threshold value and the result obtained by the volt-second integral operation performed at present reaches the third threshold value, the output voltage of the flyback switching power supply is determined to be lower than the first threshold value, wherein the fourth threshold value is less than the third threshold value.

Figure 3:
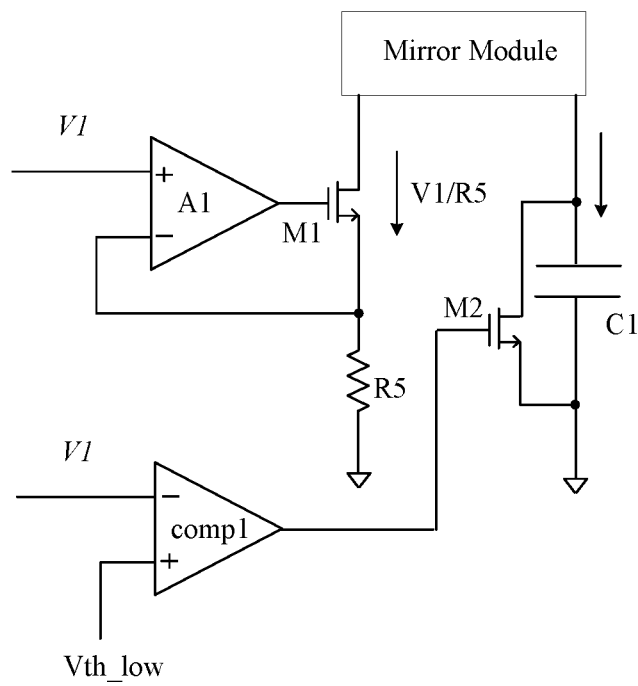
FIG. 3 shows a circuit schematic diagram of an integrating control circuit comprised in a flyback switching power supply according to a second embodiment of the present disclosure.

An integrating control circuit configured to perform the volt-second integral operation on the first voltage signal is shown in FIG. 3, and comprises a voltage-to-current converter and an integrating capacitor C1, the voltage-to-current convertor is configured to receive the first voltage signal V1 and convert the first voltage signal V1 to the corresponding current signal, a mirror current is generated by a mirror module according to the corresponding current signal, and the integrating capacitor C1 is charged by the mirror current, each volt-second integral operation starts when the first voltage signal is greater than zero or a threshold value (Vth_low) close to zero, and the integrating capacitor C1 is completely discharged or reset when the first voltage signal is less than zero or the threshold value close to zero.

The voltage-to-current module comprises an operational amplifier A1, a transistor M1 and a resistor R5, the transistor M1 and the resistor R5 are connected in series, an output terminal of the operational amplifier is connected with a control terminal of the transistor M1, the operational amplifier A1 has a first input terminal receiving the first voltage signal V1 and a second input terminal connected with a common node connected between the transistor M1 and the resistor R5, an output current obtained by converting is V1/R5, a mirror current is generated from the output current signal by a mirror module and is used to charge the integrating capacitor C1, wherein the mirror module has a proportional coefficient of 1:1 or other appropriate ratio. A transistor M2 is connected with the integrating capacitor C1 in parallel, the first voltage signal V1 is compared with the threshold value Vth_low which is zero or close to zero by a comparator comp1, an output terminal of the comparator comp1 is connected with a control terminal of the transistor M2, that is, when the first voltage signal V1 is lower than the threshold value Vth_low equal to zero or close to zero, the transistor M2 is turned on for clearing or resetting the integrating capacitor C1 by providing a discharge path to ground, and when the first voltage signal V1 reaches the threshold value Vth_low which is equal to zero or close to zero, the integrating capacitor C1 is charged by the mirror current generated by the mirror module. An input terminal of the operational amplifier A1 and an input terminal of the comparator comp1 are configured to receive the first voltage signal V1 and connect to pin VS shown in FIG. 1. The voltage-to-current convertor may be comprised in the primary-side controller, but is not limited to be integrated in the chip, that is, the voltage-to current convertor may also be realized by a separate circuit.

According to a third embodiment of the present disclosure, the basic circuit schematic of the flyback switching power supply also refers to FIG. 1 and comprises a main power switch M0, a transformer and a rectifier MSR, the transformer comprises a primary winding Np and a secondary winding Ns, the main power switch M0 is connected with the primary winding Np, and the rectifier MSR is connected with the secondary winding Ns.

Figure 4:
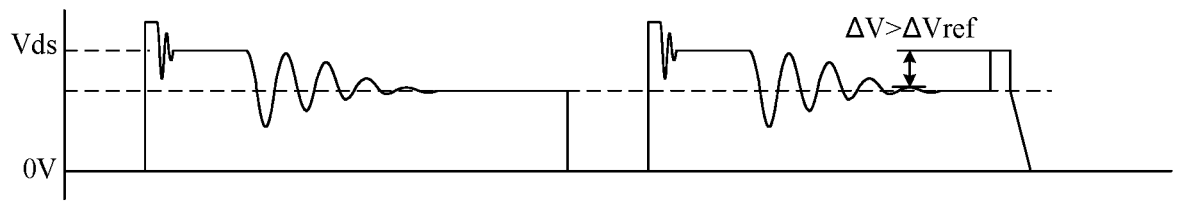
FIG. 4 shows an operating waveform diagram of a flyback switching power supply according to a third embodiment of the present disclosure.

When the output voltage of the flyback switching power supply is lower than the first threshold value Vref1, the rectifier is controlled to be turned on for the transient period; a voltage at a common node connected between the main power switch M0 and the primary winding Np or a drain-to-source voltage of the main power switch M0 is sampled to obtain a peak voltage, the peak voltage can also be obtained by sampling the input voltage of the auxiliary winding in the embodiments with the auxiliary winding, the output voltage of the flyback switching power supply is determined to be lower than the first threshold value Vref1 when a difference ΔV between the peak voltage sampled last time and the peak voltage sampled at current time reaches a difference threshold value ΔVref, the main power switch M0 is controlled to be turned on when the voltage across the auxiliary winding is lower than the low threshold. According to FIG. 2, when the rectifier MSR is turned on for the transient period, a voltage at the common node connected between the main power switch M0 and the primary winding Np or the drain-to-source voltage of the main power switch M0 increases, so that determination can be made by detecting whether the difference ΔV between the peak voltage obtained last time and the peak voltage obtained at current time reaches the difference threshold value ΔVref. Technique for sampling the voltage at the common node connected between the main power switch M0 and the primary winding Np or the drain-to-source voltage of the main power switch M0 is relatively common, thus it is not described here. When the current flowing through the secondary winding drops to zero, after a first latency period t1, the difference between the peak voltages sampled last time and the peak voltage sampled at current time is compared with the difference threshold value. Specific duration of the first latency period t1 can be set differently in different embodiments. The technical solution for avoiding direct connection according to the first embodiment can also be used in other embodiments. In this embodiment, for example, a second latency period is set to prevent the primary side from being connected to the secondary side directly, after the current flowing through the secondary winding drops to zero, when the output voltage lower than the first threshold value is detected and the second latency period reaches after the rectifier is turned off, the rectifier is controlled to be turned on for a transient period if the main power switch is not turned on. A corresponding waveform diagram according to the third embodiment of the present disclosure can refer to FIG. 4, the peak voltage obtained by sampling the drain-to-source voltage is taken as an example here, when the rectifier is controlled to be transiently turned on, the peak voltage of the drain-to-source voltage may rapidly increase, so that the difference between the peak voltage sampled last time and the peak voltage sampled at present can be used for determination.

According to a fourth embodiment of the present disclosure, the basic circuit schematic of the flyback switching power supply also refers to FIG. 1 and comprises a main power switch M0, a transformer and a rectifier MSR, the transformer comprises a primary winding Np and a secondary winding Ns, the main power switch M0 is connected with the primary winding Np, and the rectifier MSR is connected with the secondary winding Ns.

Figure 5:
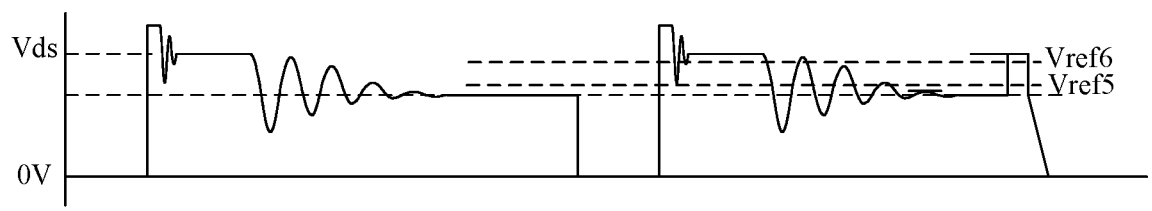
FIG. 5 shows a waveform diagram of a flyback switching power supply according to a fourth embodiment of the present disclosure.

When the output voltage of the flyback switching power supply is lower than the first threshold voltage Vref1, the rectifier is controlled to be turned on for the transient period; a voltage at a common node connected between the main power switch M0 and the primary winding Np or a drain-to-source voltage of the main power switch M0 is sampled to obtain a peak voltage, the peak voltage can also be obtained by sampling the input voltage of the auxiliary winding in the embodiments with the auxiliary winding, the output voltage of the flyback switching power supply is determined to be lower than the first threshold value Vref1 when the peak voltage sampled last time is lower than a fifth threshold value Vref5 and the peak voltage sampled currently reaches a sixth threshold value Vref6, the main power switch M0 is controlled to be turned on when the voltage across the auxiliary winding is lower than the low threshold value, wherein the fifth threshold value is lower than the sixth threshold value. When the current flowing through the secondary winding drops to zero, after a first latency period, the peak voltage sampled last time is compared with the fifth threshold value and the peak voltage sampled currently is compared with the sixth threshold value, to avoid influence caused by prophase oscillation. According to FIG. 2, when the rectifier MSR is turned on for the transient period, the voltage at the common node connected between the main power switch M0 and the primary winding Np or the drain-to-source voltage of the main power switch M0 rises, the determination is achieved by setting 2-level threshold values in order to avoid influence caused by oscillation or other interference factors. When the peak voltage obtained currently is lower than the fifth threshold value Vref5 and the peak voltage sampled next time can still reach the sixth threshold value Vref6, then it is determined that the rectifier MSR is turned on for the transient period indeed, which indicates that the output voltage drops. Technique for sampling the voltage at the common node connected between the main power switch M0 and the primary winding Np or the drain-to-source voltage of the main power switch M0 is relatively common, thus it is not described here. A corresponding waveform according to the third embodiment of the present disclosure can refer to FIG. 5, the peak voltage obtained by sampling the drain-to-source voltage is taken as an example here, when the rectifier is controlled to be transiently turned on, the peak voltage of the drain-to-source voltage may rapidly increase, so that determination can be made if the peak voltage obtained last time is lower than the fifth threshold value Vref5 and the peak voltage obtained at current time is higher than the sixth threshold value Vref6.

While the embodiments have been described and illustrated separately, it is apparent to those skilled in the art that the common parts can be replaced and combined between embodiments, and a content that is not explicitly described in one embodiment can refer to another embodiment which explicitly describes the content.

The embodiments of the present invention are described in the above paragraphs, but not construed as limiting the present invention. Any modifications, equivalence, variations of the preferred embodiments can be made without departing from the doctrine and spirit of the present invention.

The invention claimed is:

1. A flyback switching power supply, comprising a main power switch, a transformer and a rectifier, wherein the transformer comprises a primary winding and a secondary winding, the main power switch is connected with the primary winding, the rectifier is connected with the secondary winding, a control terminal of the main power switch is connected with a primary-side controller, a control terminal of the rectifier is connected with a secondary-side controller;
wherein when an output voltage of the flyback switching power supply is lower than a first threshold value, the rectifier is controlled to be turned on for a transient period by the secondary-side controller;
wherein the primary-side controller is configured to detect a negative current flowing through the main power switch for determining whether the rectifier is turned on or not, to determine that the output voltage at secondary side is lower than a threshold voltage when the negative current reaches a second threshold value and to control the main power switch to be turned on when the negative current reaches the second threshold value.

2. The flyback switching power supply according to claim 1, wherein the primary-side controller comprises a first current limitation module configured to detect a current flowing through the main power switch, and to limit the current flowing through the main power switch when the current flowing through the main power switch reaches a first current limiting value.

3. The flyback switching power supply according to claim 1, wherein the secondary-side controller comprises a second current limitation module configured to detect a current flowing through the rectifier, and to limit the current flowing through the rectifier when the current flowing through the rectifier reaches a second current limiting value.

4. The flyback switching power supply according to claim 1, wherein, when a current flowing through the secondary winding drops to zero, after a first latency period, the negative current flowing through the main power switch starts to be detected.

5. The flyback switching power supply according to claim 1, wherein after the current flowing through the secondary winding drops to zero, when the output voltage lower than the first threshold value is detected and a second latency period reaches after the rectifier is turned off, the rectifier is controlled to be turned on for the transient period if the main power switch is not turned on.

6. The flyback switching power supply according to claim 1, further comprises an auxiliary winding coupled with the transformer, wherein the auxiliary winding is connected with a voltage detecting module configured to detect a voltage across the auxiliary winding, the main power switch is controlled to be turned on when the negative current flowing through the main power switch reaches the second threshold value.

7. A flyback switching power supply, comprising a main power switch, a transformer and a rectifier, wherein the transformer comprises a primary winding and a secondary winding, the main power switch is connected with the primary winding, the rectifier is connected with the secondary winding, a control terminal of the main power switch is connected with a primary-side controller, a control terminal of the rectifier is connected with a secondary-side controller;
wherein when an output voltage of the flyback switching power supply is lower than a first threshold value, the rectifier is controlled to be turned on for a transient period by the secondary-side controller;
wherein the flyback switching power supply further comprises an auxiliary winding coupled with the transformer, the auxiliary winding is connected with a voltage detecting module configured to detect a voltage across the auxiliary winding, to sample the voltage across the auxiliary winding for obtaining a first voltage signal, and to perform a volt-second integral operation to obtain a result, when the result of the volt-second integral operation reaches a third threshold value, it is determined that the output voltage of the flyback switching power supply is lower than the first threshold value and the main power switch is controlled to be turned on when the voltage across the auxiliary winding is less than a low threshold value.

8. The flyback switching power supply according to claim 7, wherein performing the volt-second integral operation is to convert the first voltage signal to a corresponding current signal, and to charge a capacitor by the corresponding current signal when the first voltage signal is higher than a threshold value equal to or close to 0, wherein a voltage between two terminals of the capacitor represents the result of the volt-second integral operation.

9. The flyback switching power supply according to claim 7, wherein, when the current flowing through the secondary winding drops to zero, after a first latency period, the result of the volt-second integral operation is compared with a third threshold value.

10. The flyback switching power supply according to claim 7, wherein a plurality of the results are obtained by performing the volt-second integral operation for several times, if the result obtained by the volt-second integral operation performed last time is lower than a fourth threshold value and the result obtained by the volt-second integral operation performed at current time reaches the third threshold value, the output voltage of the flyback switching power supply is determined to be lower than the first threshold value, wherein the fourth threshold value is less than the third threshold value.

11. The flyback switching power supply according to claim 7, further comprises an integrating control circuit, the integrating control circuit comprises a voltage-to-current converter and an integrating capacitor, the voltage-to-current convertor is configured to receive the first voltage signal and convert the first voltage signal to a corresponding current signal, the integrating capacitor is charged directly by the corresponding current signal or by a mirror current generated from the corresponding current signal by a mirror module, the volt-second integral operation starts when the first voltage signal is greater than a threshold value equal to or close to zero, and the integrating capacitor is cleared or reset when the first voltage signal is less than a threshold value equal to or close to zero.

12. A flyback switching power supply, comprising a main power switch, a transformer and a rectifier, wherein the transformer comprises a primary winding and a secondary winding, the main power switch is connected with the primary winding, the rectifier is connected with the secondary winding, a control terminal of the main power switch is connected with a primary-side controller, a control terminal of the rectifier is connected with a secondary-side controller;

wherein the flyback switching power supply further comprises an auxiliary winding coupled with the transformer, the auxiliary winding is connected with the primary-side controller; when the output voltage of the flyback switching power supply is lower than a first threshold value, the rectifier is controlled to be turned on for a transient period by the secondary-side controller; a voltage at a common node connected between the main power switch and the primary winding, a drain-to-source voltage of the main power switch or a voltage across the auxiliary winding is sampled to obtain a peak voltage, it is determined that the output voltage is lower than the first threshold value when a difference between the peak voltage sampled last time and the peak voltage sampled at current time reaches a difference threshold value, and the main power switch is controlled to be turned on by the primary-side controller when the voltage across the auxiliary winding is lower than a low threshold value.

13. The flyback switching power supply according to claim 12, wherein, when a current flowing through the secondary winding drops to zero, after a first latency period, the difference between the peak voltage sampled last time and the peak voltage sampled at current time is compared with the difference threshold value.

14. The flyback switching power supply according to claim 12, wherein, during a process for obtaining the peak voltage by sampling the voltage at the common node connected between the main power switch and the primary winding, the drain-to-source voltage of the main power switch or the voltage across the auxiliary winding, if the peak voltage is not able to be detected after oscillation is attenuated, a latest ripple peak value during oscillation is regarded as the peak voltage sampled last time, an increased voltage caused by the transiently turn-on rectifier is detected as the peak voltage sampled at current time by peak sampling operation.

* * * * *